US010318609B2

(12) United States Patent
Blank et al.

(10) Patent No.: US 10,318,609 B2
(45) Date of Patent: Jun. 11, 2019

(54) SYSTEM FOR DETECTING THE OPERATING STATE OF A MACHINE (71) Applicant: DEERE & COMPANY, Moline, IL (US)

(72) Inventors: Sebastian Blank, Kaiserslautern (DE); Folker Beck, Rieschweiler (DE); Frank Kneip, Bruchmuhlbach-Miesau (DE)

(73) Assignee: DEERE & COMPANY, Moline, IL (US)

( * ) Notice: Subject to any disclaimer, the term of this patent is extended or adjusted under 35 U.S.C. 154(b) by 993 days.

(21) Appl. No.: 14/048,235

(22) Filed: Oct. 8, 2013

(65) Prior Publication Data

US 2014/0129192 A1 May 8, 2014

(30) Foreign Application Priority Data

Nov. 5, 2012 (DE) ........................ 10 2012 220 109

(51) Int. Cl.
*G06F 17/10* (2006.01)
*G06F 17/18* (2006.01)
*G07C 5/08* (2006.01)
*A01B 76/00* (2006.01)

(52) U.S. Cl.
CPC .............. *G06F 17/18* (2013.01); *A01B 76/00* (2013.01); *G07C 5/085* (2013.01)

(58) Field of Classification Search
CPC .......... G06F 17/18; G07C 5/085; A01B 76/00
USPC ........................................................... 703/2
See application file for complete search history.

(56) References Cited

U.S. PATENT DOCUMENTS

| 8,344,897 B2 * | 1/2013 | Peterson | A01B 69/008 340/612 |
| 8,775,034 B2 * | 7/2014 | Hyodo | E02F 9/2079 701/50 |
| 2005/0071064 A1 * | 3/2005 | Nakamura | F02D 29/04 701/50 |

(Continued)

OTHER PUBLICATIONS

Blank, S.; Kormann, G.; Berns, K. A Modular Sensor Fusion Approach for Agricultural Machines, XXXVI CIOSTA & CIGR Section V Conference, Jun. 2011, Vienna. [online] Jun. 2011. http://www.nas.boku.ac.at/fileadmin/_/H93/H931/CIOSTA_Presentations/Blank.pdf [Retrieved on Sep. 11, 2013].

(Continued)

*Primary Examiner* — Andre Pierre Louis (57) ABSTRACT

A system for deriving the operating state of a machine comprises one or more sensors for making available in each case an output value relating to a current parameter of a component of the machine, and a processing unit which is connected to the sensors and is programmed to derive information about the operating state of machine using a model and on the basis of the measured values of the sensors and/or values derived therefrom. The processing unit can be supplied with a state transition matrix, elements of an emission probability matrix for the probability that an observation is conditioned by a certain state, and a vector for describing an input state, in order to derive the operating states of the machine therefrom. The processing unit is programmed to derive elements of the emission probability matrix from the measured values of the sensors.

11 Claims, 3 Drawing Sheets (56) References Cited

U.S. PATENT DOCUMENTS

| | | | |
|---|---|---|---|
| 2005/0273218 A1* | 12/2005 | Breed | B60C 11/24 |
| | | | 701/2 |
| 2009/0306866 A1* | 12/2009 | Malikopoulos | B60W 30/1882 |
| | | | 701/59 |
| 2010/0191404 A1* | 7/2010 | Ishikawa | B60K 35/00 |
| | | | 701/31.4 |
| 2011/0004885 A1* | 1/2011 | Kikuchi | H04L 41/147 |
| | | | 718/104 |
| 2012/0185728 A1 | 7/2012 | Guo et al. | |
| 2013/0229272 A1* | 9/2013 | Elliott | G05G 9/047 |
| | | | 340/407.2 |

OTHER PUBLICATIONS

Rabiner, L.R. A Tutorial on Hidden Markov Models and Selected Applications in Speech Recognition, Proc. IEEE vol. 77, No. 2 (Feb. 1989), p. 257 et seq.

European Search Report issued in counterpart application No. 13188825.7 dated Dec. 1, 2017. (13 pages).

Sebastian Blank et al., A Modular Sensor Fusion Approach for Agricultural Machines. Internet (Jun. 30, 2011), [Retrieved on Jun. 5, 2014], Retrieved from the Internet: <URL:http://www.nas.boku.ac.at/fileadmin/data/H03000/H93000/H93100/CIOSTA_Presentations/Blank.pdf>.

* cited by examiner

SYSTEM FOR DETECTING THE OPERATING STATE OF A MACHINE

RELATED APPLICATIONS

This application claims priority to German Patent Application No. 102012220109.2, titled "Device for Detecting the Operating State of a Work Machine", filed Nov. 5, 2012, which is hereby incorporated by reference in its entirety.

TECHNICAL FIELD

The invention relates to a system for detecting the operating state of a machine.

BACKGROUND

At present, machines are being equipped with more and more actuators and sensors which serve to drive mobile elements. This relates, in particular, to agricultural machines such as self-propelling harvesting machines and tractors which can be operated with different additional equipment such as harvesting attachments for harvesting machines or towed or attached implements, for example for working the soil, for sowing or for harvesting, for tractors.

In order to provide the operator or a remote location with information about whether all the components of the machine are operating correctly and/or in order to actuate components automatically on the basis of the respective operating state of the machine, it has been proposed to detect the operating state of the machine by means of a plurality of sensors (See, Sebastian Blank, Georg Kormann, Karsten Berns, "A Modular Sensor Fusion Approach for Agricultural Machines," XXXVI CIOSTA & CIGR Section V Conference, June 2011-Vienna.) The signals of the sensors are approximated by means of a sensor knowledge manager and are fused by means of a fusion module in order to obtain a data quantity which is reduced compared to the individual sensor values but is more precise. The fused data is then subjected to fuzzy classification, and the result of this specification is analyzed using a Hidden Markov Model (HMM) in order finally to obtain information about the respective operating state of the machine. The sensor knowledge manager is fed information about the individual sensors from a sensor knowledge database, which information is required to fuse the sensor data. The fusion model and the Hidden Markov Model are fed further, statistical domain knowledge relating to the configuration of the machine from a commonly used database, which domain knowledge is used, on the one hand, to derive a rule base for the fuzzy classification and, on the other hand, to evaluate the data by means of the Hidden Markov Model.

From the mathematical perspective, the HMMs are an extension of normal Markov chains for overcoming the limitation that every transition state has to correspond to a physical observation. This result limits considerably the cases in which a temporary, probabilistic model can be applied. In order to overcome this problem, the HMM is composed of a structure of two connected statistical processes which are embedded one in the other. The first, non-observable process is a Markov chain with states and transition probabilities, and the second, observable process generates, at every point in time, emissions which are based on the current, non-observable internal (first) state. The second process is used as a means for observing the first process which emulates the very largely unknown structure of the process which is under observation.

The Hidden Markov Model $\lambda$, can be described on a standard basis by the following five variables: $\lambda$, $=\lambda(S, A, B, \pi, V)$. In this context, S is a quantity of states ($s_1$ to $s_N$) of a model, A is a state transition matrix with elements $a_{ij}$, B is an emission probability matrix with elements $b_{jk}$ for the probability that the observation $v_k$ is conditioned by the state $s_j$, $\pi$ is a vector for describing an input state and V is an observation symbol alphabet with elements $v_1$ to vM. On the basis of this concept, a multiplicity of real problems can be handled, which problems are characterized in that their internal mechanisms can in some cases not be observed and therefore only stochastic specifications can be derived from their behaviour. Accordingly, the respective state S of the model is derived from the observation V, for which purpose the input state $\pi$ and the matrices A and B have to be known and, in particular, constant (invariant over time). For further details, reference is made in this respect to the literature, for example L. R. Rabiner, A Tutorial on Hidden Markov Models and Selected Applications in Speech Recognition, Proc. IEEE Vol. 77, No. 2 (February 1989), page 257 et seq.

In the abovementioned prior art by Blank et al, the state transition matrix A, the emission probability matrix B and the input state $\pi$ are extracted from the database for statistical domain knowledge. This entails, on the one hand, a relatively high level of expenditure for the initial production of the matrix and, on the other hand, involves a certain degree of susceptibility to errors and/or tolerances of sensors because the latter are not included in the statistical, previously defined emission probability matrix B.

SUMMARY

The object on which the invention is based is considered to be to develop a system for monitoring the state of a machine and a corresponding method to the effect that the abovementioned disadvantages of the prior art do not occur, or occur to a reduced degree.

A system for monitoring the operating state of a machine comprises a sensor or a plurality of sensors for making available in each case an output value relating to a current parameter of a component of the machine and a processing unit which is connected to the sensor or sensors and is programmed to derive information about the operating state of the machine using a Hidden Markov Model and on the basis of the measured values of the sensor or sensors and/or values derived therefrom. The processing unit can be supplied with a state transition matrix A, elements of an emission probability matrix B for the probability that an observation is conditioned by a certain state, and a vector $\pi$ for describing an input state, in order to derive the operating state S of the machine on the basis of the measured values of the sensor or sensors and/or values derived therefrom (i.e. the respective observation). The processing unit is programmed to derive elements of the emission probability matrix B from the measured values of the sensor or sensors.

The system according to the invention is accordingly able to determine what operating state the working machine is currently in, from the signals of the sensor or sensors by using a Hidden Markov Model. In the case of a tractor with an attached soil-working implement, the system can therefore detect, for example, whether or not the soil-working implement is currently working the soil. Furthermore, the system can detect when the tractor is driving on a road with a raised soil processing implement or is turning in the turn space. Optionally, quantity values, such as working depth, worked area, fuel consumption, wear of the soil-working tools etc. could be evaluated and output. The Hidden Markov Model requires, as described at the beginning, a state transition matrix A, an emission probability matrix B with elements for the probability that an observation is conditioned by a certain state, and a vector π for describing an input state. The emission probability matrix B contains, according to the definition, elements $b_{jk}$ (for the probability that the observation $v_k$ is conditioned by the state $s_j$. Instead of the previous, permanently stored emission probability matrix B, it is proposed according to the present invention to derive elements of the emission probability matrix B from measured values of the sensor or sensors, e.g. to link or to correlate the measured emissions of the second process with the different states of the first process in order to determine elements of the emission probability matrix B.

In this way, the system can automatically adapt to particular situations such as varying qualities of the sensor data, uncertainties of the measured values or sensor errors, for example in the case of overheating and sensor failures.

The processing unit is preferably programmed to derive said elements of the emission probability matrix B entirely or partially from fuzzified measured values of sensors which can be fed to the Hidden Markov Model as an observation. However, any other desired pre-classification or pre-processing of the sensor values, such as clustering approaches, support vector machines, neural networks or probabilistic approaches would also be possible. Additionally or alternatively, the processing unit can derive the abovementioned elements of the emission probability matrix B entirely or partially from measured values of monitoring sensors in order to detect the state of sensors and/or to monitor an operator.

According to a second aspect of the invention, the processing unit is programmed to select or to determine a model for the respective operating mode of the machine on the basis of measured values of sensors and/or a position-determining system and to select the state transition matrix A and the vector π on the basis of the determined model from a database in which different state transition matrices are stored for different operating modes of the machine. Accordingly, a plurality of different state transition matrices A and/or vectors π are stored in a database, and whenever a state estimation loop is run through it is decided which state transition matrix A and/or which vector π is then to be used.

The decision regarding the model for the operating mode can be made on the basis of the signals of a position-determining system for detecting the country and the region (in order to detect which agricultural practices are customary there) and/or to determine the position of the machine in the field, in particular for the purpose of differentiating between a turning place and the actual field operating mode. Additionally or alternatively, the model for the operating mode can be detected on the basis of the position of a switch for switching over between the road operating mode and the field operating mode, or it is detected whether maintenance is currently being performed on the machine. It is also possible to detect whether or not a driver is located on board or whether the machine is currently being steered automatically. Furthermore, elements of the state transition matrix A can be modified online. These elements are accordingly not obtained directly from the static database but instead are not calculated until during operation. There is therefore the possibility, when approaching the turning place, of increasing the probability of a turning process and of decreasing the probability of a transportation journey on the field, which leads to correspondingly rising or falling probabilities in the state transition matrix A. Accordingly, just a single model is no longer used for the operating state but instead a plurality of such models are used simultaneously and said models are each assigned probabilities, and the state transition matrix A and the input state π are correspondingly selected.

According to a third aspect of the invention, the processing unit is programmed to carry out a subsequent step for determining the operating state of the machine only if a different state transition matrix A and/or a different vector π have/has been selected since a previous subsequent step and/or a sufficient data quantity for differentiating between different operating states is present.

In particular, the processing unit can determine the time of the subsequent step as a function of the diagonal elements of the state transition matrix A.

BRIEF DESCRIPTION OF THE DRAWINGS

An exemplary embodiment of the invention which is described in more detail below is illustrated in the drawings, in which.

DETAILED DESCRIPTION OF THE DRAWINGS

Figure 1:
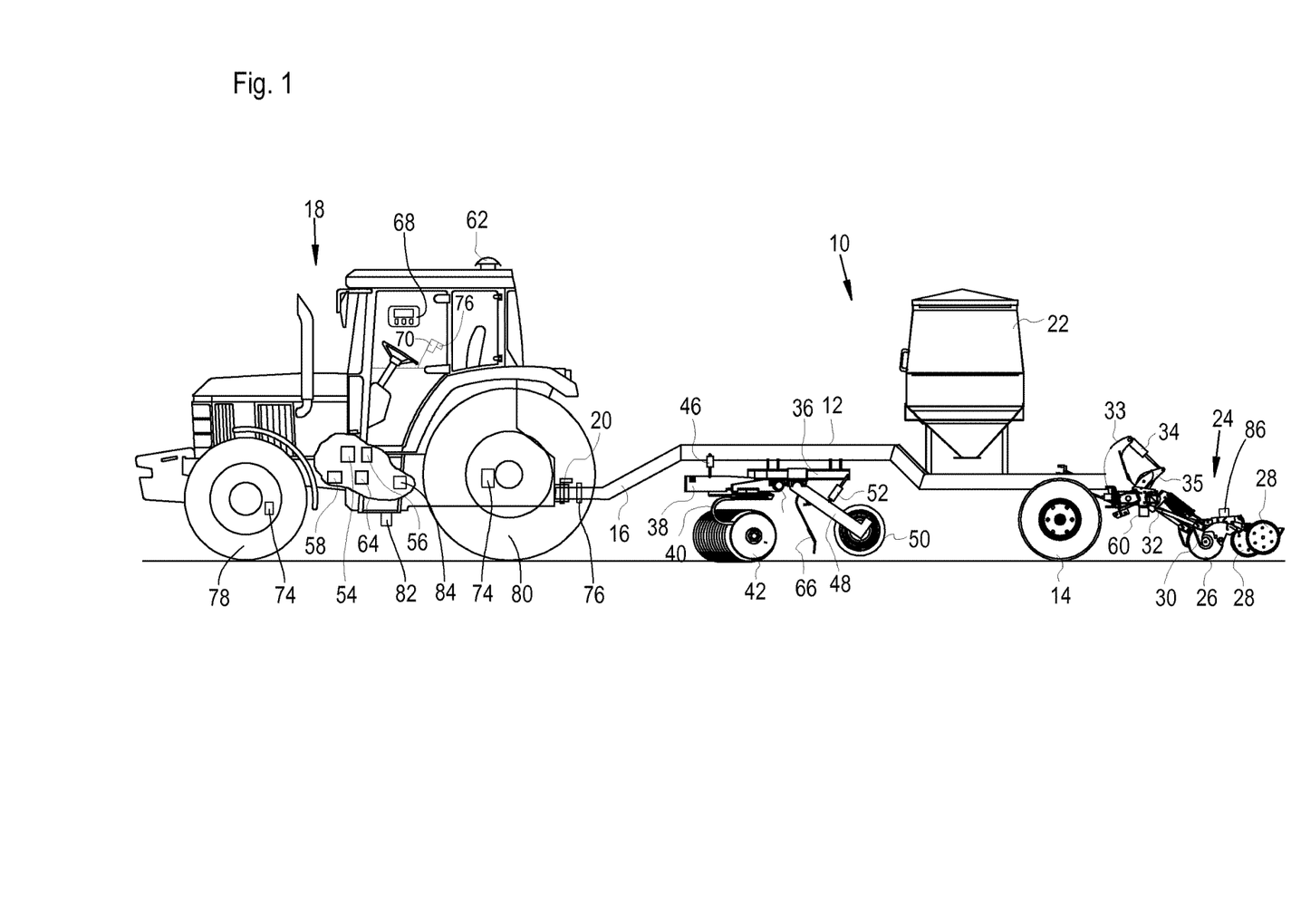
FIG. 1 is a side view of an agricultural machine in the form of a tractor and a towed implement according to an embodiment.

FIG. 1 illustrates an agricultural machine in the form of a tractor 18 with a till and drill combination 10 (i.e., implement) which is towed by the tractor 18. The till and drill combination comprises a frame 12, which extends in the forward direction which runs from right to left in the drawing, said frame 12 being supported on the soil via running gear which comprises running wheels 14. At its front end, the frame 12 is coupled to the tractor 18 via a drawbar 18 via a releasable hitch 20.

The frame 12 supports, in front of the running wheels 14, a seed container 22 for holding seeds. By means of measuring systems (not shown in the drawing), the seed is metered out of the seed container 22 and fed via seed lines to sowing devices 24 arranged on the rear of the frame 12, said sowing devices 24 comprising a furrow opener 26 in the form of a disc, sowing coulter 30, which discharge the seed into the furrow produced by the furrow opener 26 and comprise closing wheels 28 for subsequently closing the furrow.

A plurality of sowing devices 24 are supported laterally one next to the other on a tool carrier 32 which is supported on the frame 12 and extends laterally with respect to the forward direction. The sowing devices 24 are mounted so as to be pivotable about an axis which runs parallel to the longitudinal axis of the tool carrier 32. The pivoting angle of all the sowing devices 24 and therefore the sowing depth is specified by means of an actuator 34 in the form of a hydraulic cylinder which extends between a mount 33, connected to the frame 12, and an arm 35 which is coupled to the sowing devices 24.

In front of the seed container 22, a carrier frame 36 is attached underneath the frame 12. The carrier frame 36 secures a pivoting frame 38 which can be pivoted about a horizontal pivoting axis 44 which runs transversely with respect to the forward direction, and on which pivoting frame 38 a soil-working tool 42 in the form of a disc harrow is supported via a U-shaped spring 40. An actuator 46, which is in the form of a hydraulic cylinder arranged between the frame 12 and the pivoting frame 38, defines the pivoting angle of the pivoting frame 38 about the pivoting axis 44. The actuator 46 can be operated with an adjustable pressure and in this way controls the pressure with which the soil-working tool 42 acts on the soil. Any other soil-working tool 42 can be used instead of the disc harrow.

A mount 48, which can be pivoted about an axis running parallel to the pivoting axis 44 and to whose lower end a soil roller 50 in the form of a tyre packer roller is attached, is also coupled in an articulated fashion to the carrier frame 32, in the forward direction behind the soil-working tool 42. An actuator 52 in the form of a hydraulic cylinder which extends between the carrier frame 36 and the mount 48 defines the pivoting angle of the mount 48. An adjustable pressure can be applied to the actuator 52, and in this way said actuator controls the pressure with which the soil roller 42 acts on the soil.

U-shaped springs 40 which are connected to the pivoting frame 38 are arranged at the two lateral ends of the soil-working tool 42. Mounts 48 are also arranged at the two lateral ends of the soil roller 50 and connected to the carrier frame 36. The soil-working tool 42 and the soil roller 50 can be composed of three or more sections arranged laterally one next to the other, the outer of which can be folded up in a manner known per se for road transportation. For this purpose, corresponding drives in the form of hydraulic cylinders are to be provided. A comb 66, which is connected to the carrier frame 36, is arranged between the soil-working tool 42 and the soil roller 50.

In view of the above, the till and drill combination 10 constitutes a combination of a sowing machine with the seed container 22 and the sowing devices 24, on the one hand, and a soil-working device with the soil-working tool 42, the comb 66 and the soil roller 50, on the other.

The tractor 18 is equipped with a control device 54 which is configured to apply, via lines not illustrated in the drawing, hydraulic fluid to the actuators 34, 36 and 52, or to relieve them therefrom via said lines, by means of a valve device 56 containing proportional valves, from a source 58 of pressurized hydraulic fluid. In the illustrated embodiment, the actuators 34, 46 and 52 are double-acting in order to be able to lift the working elements of the till and drill combination 10 in the turning place or during travel on a road. It would also, however, be conceivable to use single-acting hydraulic cylinders. The control device 54 is therefore configured to predefine the pressure of the actuators 46 and 52. Information about the position of the actuator 34 is fed to the control device 54 via a sensor 60, with the result that the sowing depth of the sowing devices 24 can be rated by the control device 54 by means of the valve device 56.

The valve device 56 can be located on board the tractor 18, as shown in FIG. 1, or on board the till and drill combination 10. In the second case, it would be connected to the control device 54 via a bus system, for example an ISO bus, which also produces the connection between the control device 54 and the actuator 86 and the sensor 60. Furthermore, the control device 54 could also be arranged on board the till and drill combination 10 and only the operator input device 68 could be positioned as a virtual terminal on board the tractor 18 and connected via a bus system to the control device 54 (and if appropriate to a further processing device of the tractor 18, which processing device controls the actuator 18 and the valve device 56).

A speed sensor 74 senses the rotational speed of a front wheel 78 or rear wheel 80 of the tractor 18 and also feeds its signals to the control device 54. The speed of the tractor 18 over the ground can also be sensed by means of a radar sensor 82.

An actuator 84 in the form of a speed-predefining device is connected to the control device 54 and serves to predefine the forward speed of the tractor 18 by adjusting the rotational speed of the drive engine of the tractor 18 and/or the gear transmission ratio between the drive engine and the drivable wheels 78 and/or 80. An actuator 86 predefines the distance at which the sowing devices 74 deposit seed in the ground. The actuator 86 can serve, for example, to drive the measuring systems of the sowing devices 24 or to change the rotational speed thereof.

Finally, an operator input device 68, which is also connected to the control device 54, is also provided at the workstation on the tractor 18. The control device 54 and the components connected thereto, including a memory device 64, are illustrated schematically in FIG. 2. The operator input device 68 permits the operator seated in the cab of the tractor 18 to input various operating parameters of the till and drill combination 10, namely the sowing depth (adjustment of the actuator 34 with feedback via the sensor 60), the soil pressure of the soil roller 50 (actuator 52) and the soil pressure of the soil-working tool 42 (actuator 46). The operator predefines the propulsion speed of the tractor 18 by means of a control lever 70, which serves to actuate the actuator 84. Depending on the respective speed predefinition (control lever 70) or the current speed (speed sensor 74 or radar sensor 82), the actuator 84 is also actuated in order to bring about spacing of the seed in the field, which is input with the operator input device 78. The lifting out of the tools of the till and drill combination 10 at the end of the field by means of the actuators 34, 46, 52 is carried out by means of a turning-place input device 76 on the control lever 70. When a first pushbutton key of the turning-place input device 76 is activated, the tools are lifted up, and when a second pushbutton key of the turning-place input device 76 is activated they are lowered again.

The operation of the tractor 18 and of the till and drill combination 10 is accordingly controlled manually during the field work by the operator in the cab of the tractor 18.

Figure 2:
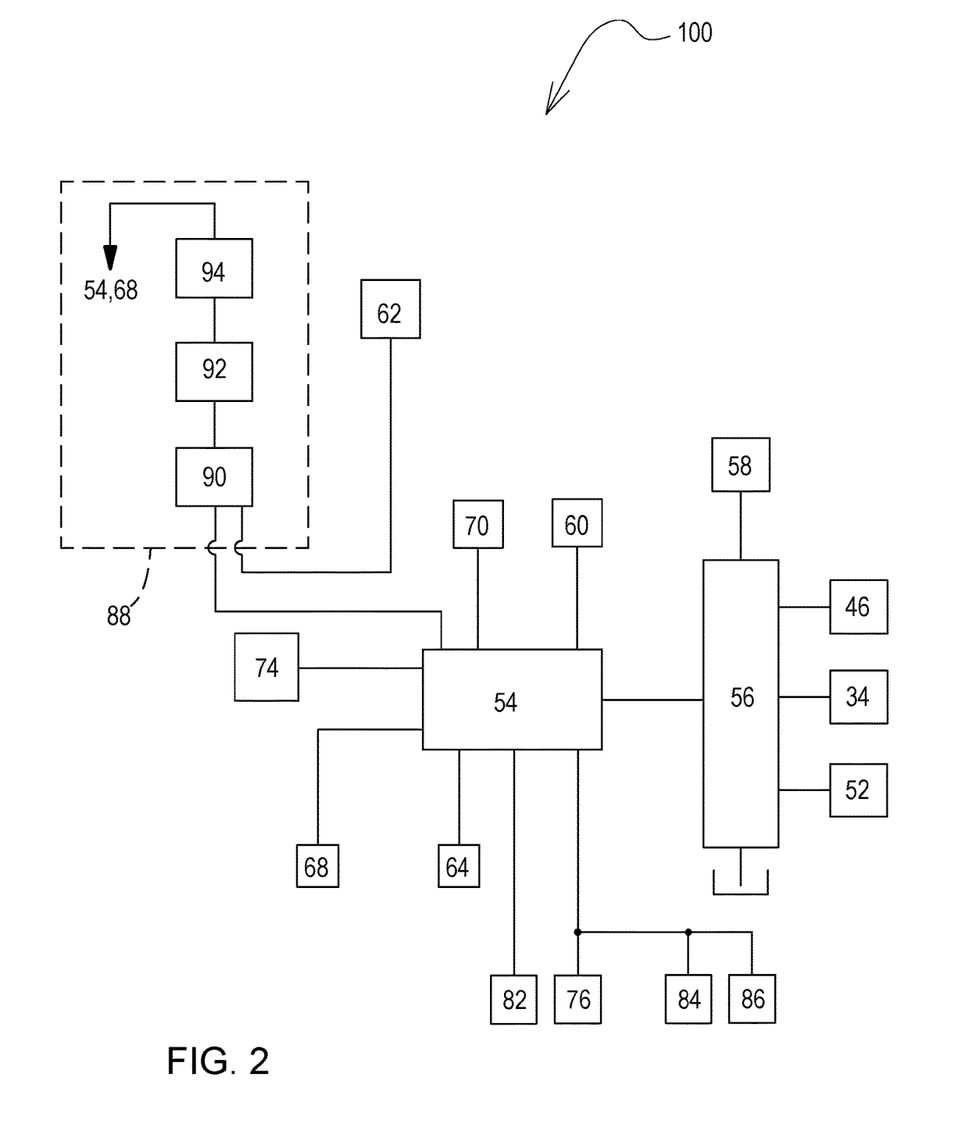
FIG. 2 is a block diagram of system according to an embodiment.

In FIG. 2, a system 100 is shown according to an embodiment. In order to document the operation of the tractor 18 and the till-and-drive combination 10, the system 100 can comprise a processing device 88 connected to the control device 54, wherein the processing device 88 is configured to derive the operating state of the tractor 18 and of the till and drill combination 10 and document[[s]] it over time in a geo-referenced fashion. Signals containing information about the respective position of the tractor 18 are fed to the processing device 88 by a position-determining system 62 with a satellite reception antenna which is configured to receive GPS (Global Positioning System) signals. The connection between the processing device 88 and the control device 54 can, as illustrated in FIG. 2, be made via a separate line, or it is done through a bus line (not shown) which extends via the tractor 18 and preferably also via the till and drill combination 10 and to which the control device 54, the processing device 88 and the operator input device 68, embodied as a virtual terminal, as well as, as mentioned above, a controller (not shown) of the valve device 56 and of the sensor 60 are connected. The position-determining system 62, the turning input device 76, a sensor for detecting the position of the control lever 70, the speed sensor 74 and/or the radar sensor 82, the actuator 84 and the actuator 86 (or controllers assigned to them) can also communicate with the control device 54 via this bus line.

The processing device 88 therefore receives, directly and/or via the bus line and/or from the control unit 54, information about the outputting of the position-determining system 62, the signals of the sensors 70, 74, 82 and the setpoint state of the actuators 84 and 86 as input signals. The processing device 88 comprises a fusing module 90 in which input signals of different origins are fused with one another in order to reduce the quantity of data and obtain more precise data. For example, the signals of the speed sensor 74, of the radar sensor 82, of the actuator 84 and of the control lever 70 can be fused with one another in order to obtain a more precise signal relating to the speed of the tractor 18. For this purpose and in order to make available formatting data, possibly necessary for the fusion, reference is made to the disclosure in DE 10 2010 031 344 A1. The fused data are then fed to a fuzzy classification means 92 which assigns the data probabilities of them occurring in individual classes. It is therefore possible, on the basis of the speed value supplied by the fusion module 90 and the data from the position-detection system 62, to respectively output a probability for the following states: "detected idling", "detected transportation journey on a road", "detected transportation journey in a field", "detected field work" and "detected unknown state".

These fuzzy-classified probabilities are then fed to a Hidden Markov Model 94, which is used by the processing device 88 to derive the operating state of the tractor 18 and the till and drill combination 10 from these probabilities. This operating state may comprise, for example, the states "idling", "transportation on a road", "transportation in a field" and "field work". This detected operating state can be displayed to the operator on a display panel of the operator input device 68. In addition, said operating state can be stored (for example for billing purposes of an agricultural contractor) with the associated times and/or said operating state can serve to actuate components of the tractor 18 or of the till and drill combination 10, for example in order to switch off the engine after a relatively long idling period.

The described procedure firstly appears somewhat laborious because the operating state could be derived directly from a number of available data items. However, this would require complicated, very machine-specific programming since a knowledge of the significance of the data necessary to detect the operating state would be necessary. The processing device 88 according to the invention is distinguished in contrast to this by universal applicability without programming which is adapted to the respective machine. It is therefore not necessary to take into account details of the till and drill combination 10, for which reason the processing device 88 could also be used on a tractor with a spraying device or a sowing machine without reprogramming. Furthermore, the chronological dependence of the states can be observed by means of the HMM processing.

Figure 3:
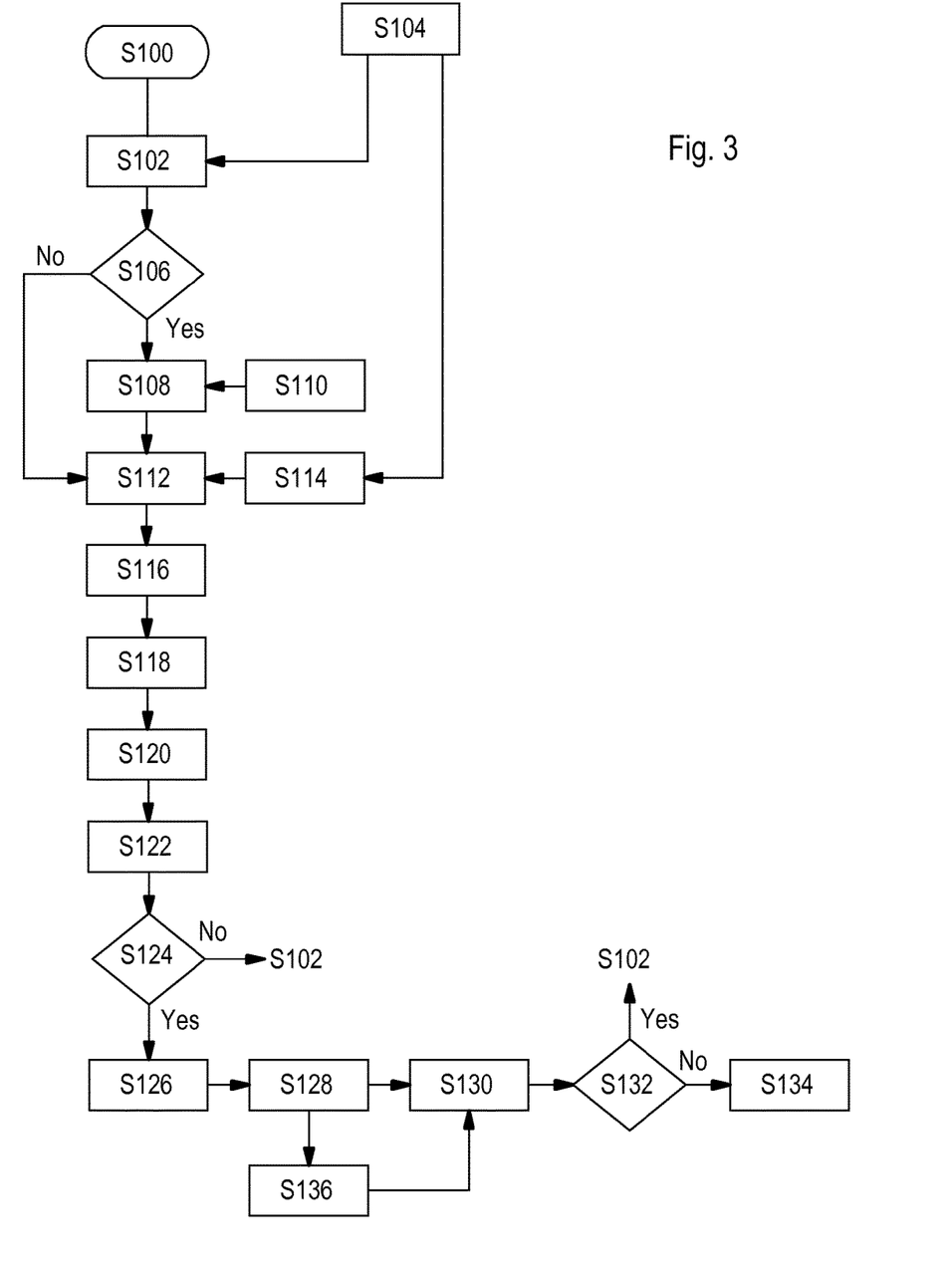
FIG. 3 is a flow diagram of the operations of the system of FIG. 2.

The operation of the processing device 88 is as illustrated in FIG. 3. After the start and the initialization in the step S100, the step S102 follows in which data for the definition of a model is evaluated. A model which characterizes the respective operating mode of the tractor 18 is therefore determined. The data used for this can be derived by the position-determining system 62 via the bus line (in particular signals of the sensors 70, 74, 82 and the setpoint state of the actuators 84 and 86), or from other calculations (S104). Possible models would be, for example, "field work", "journey on a road", "maintenance", "approaching turning place". The decision on one of the models can be made, for example, by using the signals of the position-determining system 62 and/or the speed sensor 74, wherein the region and the country in which the tractor is being used (and, if appropriate, specific, country-typical procedures for the field work) and/or the position of the tractor 18 with respect to the boundaries of the field can be derived on the basis of the signals of the position-determining system 62. If a switch for switching over between road operation and field work is present, which switch can be integrated, for example, in the operator input device 68, the position of said switch can also be detected. In the case of maintenance work, typically a flap is opened whose position can be detected, or it is detected whether the tractor 18 is being steered automatically or manually.

The step S106 follows in which it is interrogated whether a new model is to be used, which is decided on the basis of the previous model and of the model determined in the step S102. If a new model is required, the step S108 follows in which the state transition matrix A and the input state $\pi$ which are associated with the model are read out from a model database (S110), as a function of the model determined in the step S102.

The step S108 is then followed by the step S112 in which, on the one hand, the external observations (step S114) which originate from the fuzzy classification means 92 are fed to the Hidden Markov Model 94. The step S114 can optionally (also) use data from the step S104. In addition, data from a machine monitoring means, such as is generally used for telemetric purposes for remote monitoring of the state of the machine (checking of the rotational speed of the engine, engine temperature, fuel consumption, etc.), from a sensor state monitoring means which checks output values of the sensors for plausibility, and/or from an operator monitoring means which uses a camera to detect the activities and inputs of the operator in the cab, is acquired in the step S114 and fed to the step S112. This data is used as observations by the Hidden Markov Model. On the other hand, according to the innovation this data is used to evaluate online the respectively required elements of a column of the respectively used emission probability matrix B for the Hidden Markov Model. The elements of the emission probability matrix B are therefore not extracted from a previously stored database but are evaluated on the basis of the current observations. This has the advantage that varying qualities of the sensors and uncertainties of the measured values can be allowed for, and effects of sensor failures, temperature dependencies, overheating etc. can be compensated for.

The step S112 is also passed through when the step S106 has revealed that a new model should not be used.

The step S112 is followed by the step S116, which is concerned with the forward step of a "Forward/Backward algorithm" for evaluating the Hidden Markov Model. The step S118 follows in which the state probabilities are scaled, and the step S120 follows in which the data obtained in the step S118 is written into a stack memory. In the step S122, the conditions for the subsequent step (backtracking) are then calculated for the evaluation of the Hidden Markov Model. For this purpose, it is determined, for example, whether the same state is still present as in the last run through the step S122 (that is to say, all the states have the same predecessor), whether the stack memory is completely filled, whether the tractor 18 is switched off, whether there is data traffic on the bus line, whether an abort condition is present or whether the model (step S106) has been changed and whether there is sufficient data present to differentiate between concealed states. Furthermore, the diagonal elements of the state transition matrix A, which have a relationship with the expected dwell time in a state, can be used to determine the conditions for a subsequent step (backtracking). If one or more of these conditions is met, in the subsequent step S124 the system proceeds to the step S126, and otherwise the step S102 follows again. It is therefore determined online in the steps S122 and S124 whether or not the backtracking step S126 is carried out, wherein one or more of the conditions mentioned in this paragraph are interrogated.

In the step S126, the subsequent step (backtracking), occurs, and is followed by the step S128 in which the state estimation results are stored in a memory. This is followed by the step S130 in which the stack memory is reset by positioning its pointer at the first entry again, and optionally all the described memory elements are overwritten, for example with the value 0 (zero). Then, in the step S132 it is interrogated whether the loop is to be run through once more, and if this is the case, the step S102 follows, and otherwise the end follows in the step S134. The step S128 can be followed (instead of going straight to the step S130) by the step S136 in which the acquired data (Hidden Markov Model, state, estimation and results) is stored and at least the determined operating state is displayed, for example, on the display of the operator input device 68.

If a stack memory is used with a fixed size, in the step 124 it is merely interrogated whether the memory is full and/or whether an abort condition is present and/or whether the tractor is switched off, and then the step 126 or 102 then follows. For details regarding the Viterbi algorithm (steps S116 and S126), reference is made to the literature, in particular to the publication by L. Rabiner mentioned at the beginning.

Steps in FIG. 3
S100 Start, initialization
S102 Evaluate data for defining a model
S104 External data (CAN, GPS, calculated data)
S106 New model?
S108 Model selection (state transition matrix A and input state 7E)
S110 Model database for HMM
S112 Receive observation and determine elements of the emission probability matrix B
S114 External observation (output of 92 etc.)
S116 Forward step (Viterbi)
S118 Scaling
S120 Stack memory input
S122 Calculate conditions for backtracking
S124 Carry out backtracking?
S126 Subsequent step (Viterbi)
S128 Write estimation results into memory
S130 Reset stack memory
S132 Run through loop again?
S134 End
S136 Storage and outputting of data

What is claimed is:

1. A system for deriving an operating state of a machine, the system comprising:
   at least one sensor, wherein the at least one sensor is configured to generate an output value relating to a current parameter of a component of the machine;
   a processing unit connected to the at least one sensor, wherein the processing unit is configured to derive information about the operating state of the machine based in part on at least one of: a measured value of the at least one sensor or a value derived from the at least one sensor, and
   wherein the processing unit is configured to derive elements of an emission probability matrix from the measured values of the at least one sensor-to determine a model to derive at least one operating state of the machine based on the derived elements of the emission probability matrix, a state transition matrix, and a vector for describing an input state supplied to the processing unit, wherein the elements of the emission probability matrix B are not extracted from a previously stored database but are evaluated on the basis of the current observations, said model being derived in real-time based on said generated output; and
   a control device communicatively connected to the processing unit, wherein the control device actuates a component of the machine or an implement attached to the machine based at least in part on the derived operating state of the machine.

2. The system according to claim 1, wherein the elements of the emission probability matrix are derived from a plurality of fuzzified measured values of the at least one sensor.

3. The system according to claim 1, wherein the elements of the emission probability matrix are derived from measured values of a sensor state monitoring system for detecting a state of the at least one sensor or a state of a device for monitoring an operator.

4. The system according to claim 1, wherein the machine comprises an agricultural machine.

5. The system according to claim 1, wherein the implement comprises a soil-working implement.

6. The system according to claim 1, wherein the derived operating state of the machine is displayable on a display panel of the machine.

7. A system for deriving an operating state of a machine, comprising:
   at least one sensor, wherein the at least one sensor is configured to generate an output value relating to a current parameter of a component of the machine;
   a processing unit connected to the at least one sensor, wherein the processing unit is configured to derive elements of an emission probability matrix from the values of the at least one sensor, and wherein the processing unit determines a model for a respective operating mode of the machine based in part on measured values of at least one of: the emission probability matrix, a position-determining system, wherein the elements of the emission probability matrix B are not extracted from a previously stored database but are evaluated on the basis of the current observations, said model being derived in real-time based on said generated output, and
   at least one state transition matrix or a vector describing a respective input state, based at least in part on the determined model for the respective operating mode from a database in which different state transition matrices and vectors for different operating modes of the machine are stored to determine an operating state of the machine based on the model; and
   a control device communicatively connected to the processing unit, wherein the control device actuates a component of the machine or an implement attached to the machine based at least in part on the derived operating state of the machine.

8. The system according to claim 7, wherein elements of the at least one state transition matrix are determined during operation.

9. A system for deriving an operating state of a machine, comprising:

at least one sensor, wherein the at least one sensor is configured to generate an output value relating to a current parameter of a component of the machine;

a processing unit connected to the at least one sensor, wherein said processing unit is configured to derive information about the operating state of the machine based in part on at least one of: a measured value of the at least one sensor or a value derived from the at least one sensor, and wherein the processing unit is configured to derive elements of an emission probability matrix from the values of the at least one sensor, and wherein the processing unit is configured to derive elements of an emission probability matrix from the values of the at least one sensor and to determine a model to derive at least one operating state of the machine based on the derived elements of the emission probability matrix, a first state transition matrix, and a first vector for describing an input state supplied to the processing unit, wherein the elements of the emission probability matrix B are not extracted from a previously stored database but are evaluated on the basis of the current observations, said model being derived in real-time based on said generated output, and wherein the processing unit is further configured to carry out a subsequent step of determining a model to derive an operating state of the machine based on at least one of: a second transition matrix, a second vector, and a data quantity for differentiating one or more operating states; or a change in the operating state; and a control device communicatively connected to the processing unit, wherein the control device actuates a component of the machine or an implement attached to the machine based at least in part on the derived operating state of the machine.

10. The system according to claim 9, wherein a time for deriving an operating state of the machine is determined as a function of a plurality of diagonal elements of the state transition matrix.

11. The system according to claim 9, wherein the second state transition matrix and the second vector is different than the first state transition matrix and the first vector.

* * * * *